Figure 1:
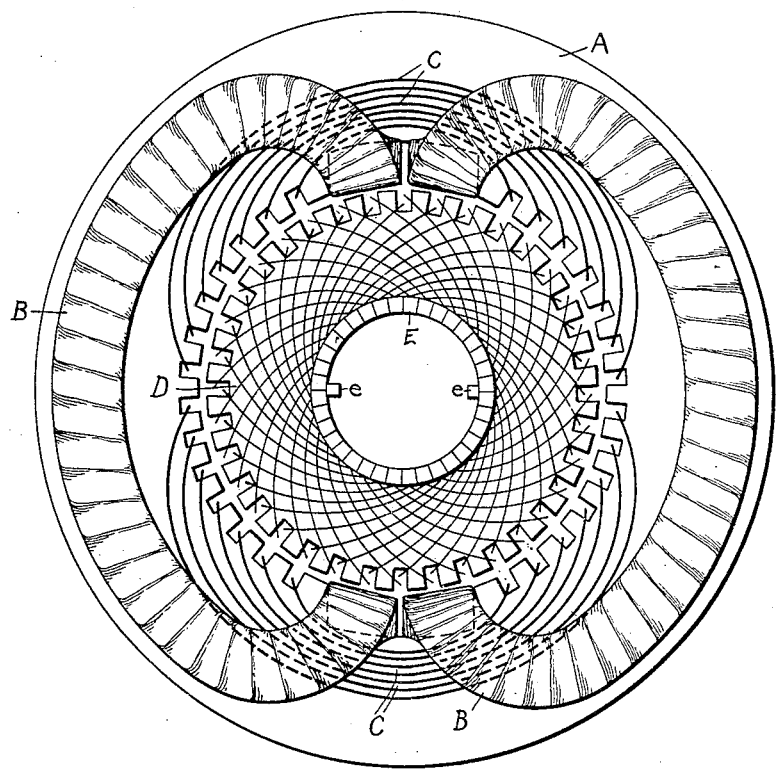

E. F. W. ALEXANDERSON.
ELECTRIC MOTOR.
APPLICATION FILED MAR. 1, 1907.

923,311.

Patented June 1, 1909.
3 SHEETS—SHEET 1.

Witnesses:
Irving E. Sterr.
J. Ellis Glen

Inventor
Ernst F. W. Alexanderson,
by Albert G. Davis
Att'y.

E. F. W. ALEXANDERSON.
ELECTRIC MOTOR.
APPLICATION FILED MAR. 1, 1907.
923,311.
Patented June 1, 1909.
3 SHEETS—SHEET 3.
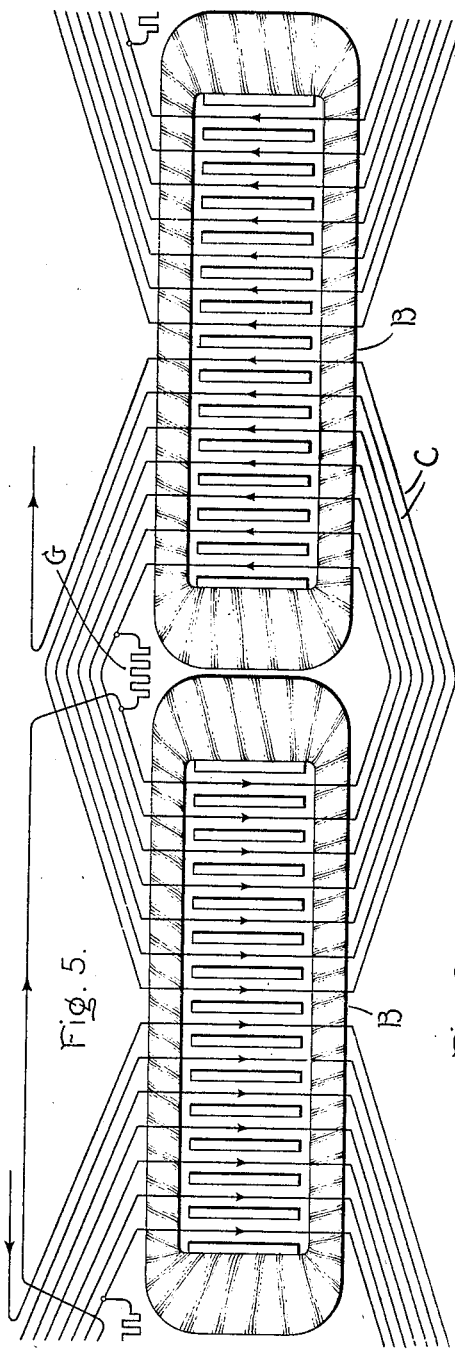
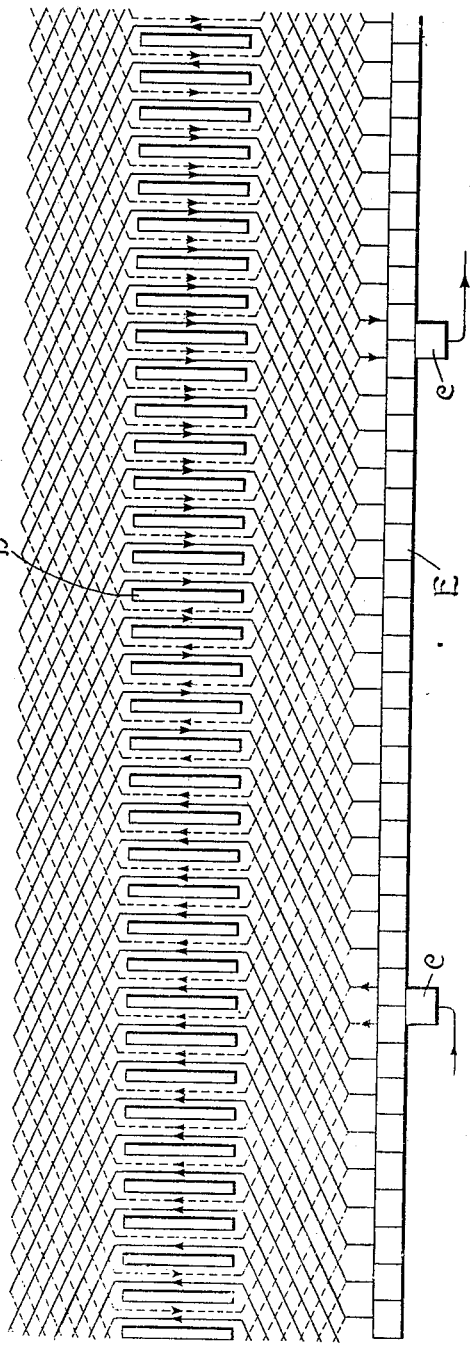
Witnesses:
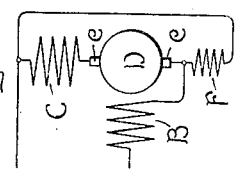
Inventor:
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC MOTOR.

No. 923,311.

Specification of Letters Patent.

Patented June 1, 1909.

Application filed March 1, 1907. Serial No. 359,957.

*To all whom it may concern:*

Be it known that I, ERNST F. W. ALEXANDERSON, a citizen of the United States, residing at Schenectady, county of Schenectady, State of New York, have invented certain new and useful Improvements in Electric Motors, of which the following is a specification.

My invention relates to compensated electric motors of the commutator type, and is particularly applicable to alternating-current compensated series motors; though in its broader aspect it is not limited to alternating-current motors, nor to a series connection of the field.

The object of my invention is to provide the motor with a commutating field without employing an interpole construction.

In alternating-current compensated series motors there frequently is not room for either a commutating pole or a compensating winding in the interpole space, which is ordinarily filled by the field winding. In alternating-current motors it is highly desirable to compensate perfectly for the armature self-induction in order to secure high power-factor and efficiency, and, owing to the special difficulties in commutation in alternating-current motors, the production of a commutating field is highly desirable. By my invention I am enabled to obtain both these results without the necessity of a commutating pole or compensating winding in the interpolar space. I secure this result by winding the armature with a fractional pitch approximately equal to the width of the pole face. With such an arrangement the currents in the coil conductors on that portion of the armature which is at any instant opposite the polar space neutralize each other, since, owing to the fractional pitch, the currents in half the conductors in each slot in this portion of the armature, are flowing in the opposite direction to the currents in the other half. Consequently the only portions of the armature which require compensation are those which lie opposite the field poles, so that a compensating winding distributed over the pole faces only is sufficient for perfect compensation. Furthermore, on account of the coil-width selected for the armature, each coil short-circuited by a commutator brush is just passing the tips of the pole, so that if a commutating field is produced at the pole tips, it is at the proper position. Such a field at the pole tips may readily be produced. In a direct-current motor it is sufficient merely to design the compensating winding to over-compensate the armature reaction, while in an alternating-current motor, in which the phase of the commutating field should differ from that of the main field, the desired commutating field may be secured in a simple manner, as will be hereinafter explained.

My invention will best be understood by reference to the accompanying drawings, in which—

Figure 2:
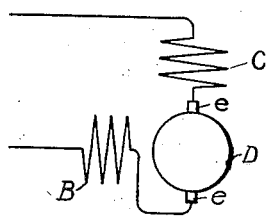
Figure 3:
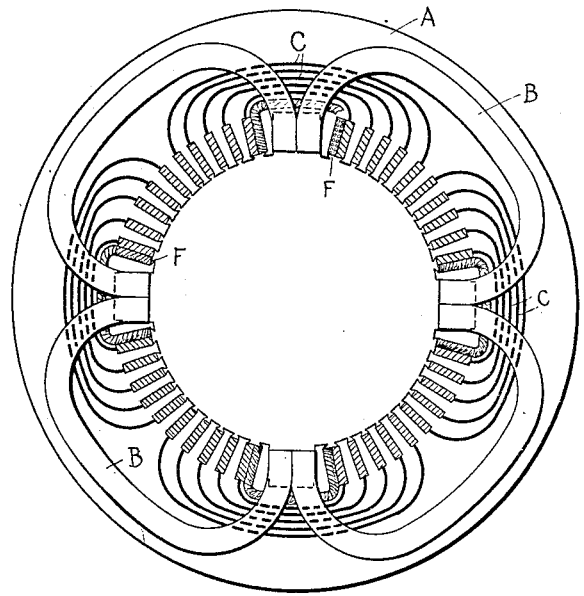
Figure 4:
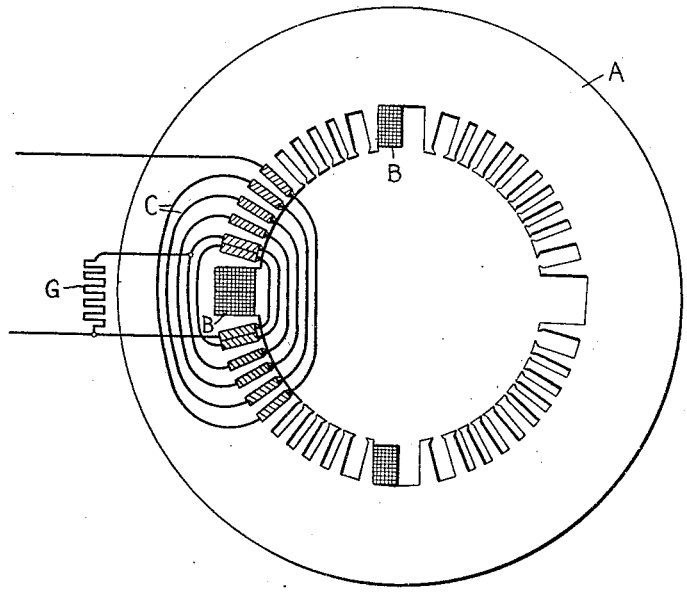

Figure 1 shows diagrammatically a compensated motor arranged in accordance with my invention; Fig. 2 shows the connection of the windings for a series motor; Figs. 3 and 4 show modifications for securing the proper phase of commutating field for an alternating-current motor; Fig. 5 shows diagrammatically a development on a plane surface of the stator windings arranged as in Fig. 4; Fig. 6 shows a development on a plane surface of the armature windings; and Fig. 7 is a diagram of the connections of the windings arranged as in Fig. 3.

In Fig. 1 A represents the field structure, which for an alternating-current motor, is laminated. This field structure is provided with polar projections between which are mounted the main field coils B. C represents the compensating winding, the coils of which are each indicated diagrammatically by a single line. D represents the armature, E the commutator, and *e e* the commutator brushes. The armature coils have a fractional pitch, the width of each coil being approximately equal to or a little less than the breadth of a pole face. The effect of the fractional-pitch winding is, as is well understood in the art, to produce in a certain portion of the armature a neutralization of the magnetizing effect of the current in one coil by the current in another coil in the same slot. With the breadth of coil shown in Fig. 1, this neutralization occurs in all the slots opposite the interpolar space of the field, so that only the coil conductors opposite the pole faces are effective in producing magnetization. Consequently the compensating winding shown, although it is distributed over the pole faces only, is sufficient for producing perfect compensation. The effect of the fractional pitch on current distribution and distribution of magnetomotive force is best shown in Fig. 6, where the directions of current at any instant in each armature coil are shown by arrow-heads, and this figure, taken in connection with Fig. 5, shows the relation of the armature currents to the field-poles and currents in the compensating winding.

The connections of armature, compensating winding, and field, for a series motor are shown diagrammatically in Fig. 2.

From an inspection of Fig. 1, and of Figs. 5 and 6 it will be seen that the coils which are short-circuited by the commutator-brushes are just approaching or leaving the pole tips. Consequently, if a flux of proper amount and phase is produced at the pole tips, it will be in proper condition for serving as a commutating field. In Fig. 3 I have shown special coils F, located at the tips of the poles, so as to produce a commutating field of the proper amount and, in an alternating-current motor, of the proper phase. This commutating field in an alternating-current motor should not be in phase with the main current, but should be displaced therefrom, as is well understood in the art, so that the conductors of the compensating winding C, which are in the main motor circuit, would not alone produce a commutating field of the proper phase. By employing the special coils F a flux of any desired phase may be produced at the pole tips by supplying current of the proper phase and amount to these coils. The desired phase of the current in the coils F may be obtained by any suitable connection, as, for instance, by a shunt-connection, shown in Fig. 7.

In place of using special coils for the commutating field, the same result may be obtained by shifting the phase of the current in the conductors of the compensated winding itself, which lie at the pole tips. Such an arrangement is shown in Figs. 4 and 5. In these figures the two coils of the compensating winding, which lie in the slots nearest the pole tips, are shunted by an impedance G, which is proportioned with the proper impedance-factors for securing the desired current phase in the conductors of the compensating winding which it shunts. A non-inductive resistance, such as is indicated in the drawing, is adapted for this purpose, since it serves to lag the phase of the current in the coils of the compensating winding which it shunts.

It will be understood that I have illustrated my invention diagrammatically, and that in practice any well-known form of windings and motor construction may be employed.

What I claim as new and desire to secure by Letters Patent of the United States, is,—

1. In a dynamo-electric machine, a field magnet having polar projections, main field coils carried in the interpolar spaces, a compensating winding distributed on the pole faces, an armature provided with a commutator, and armature coils having a fractional pitch equal to the breadth of the pole faces.

2. In a dynamo-electric machine, an armature provided with a commutator and a fractional pitch winding, a laminated field structure, a compensating winding distributed over a portion only of the field corresponding to the pitch of the armature coils, and magnetizing coils occupying the portion of the field magnet not occupied by the compensating winding.

3. In a dynamo-electric machine, a laminated field magnet having polar projections, main field coils carried in the interpolar spaces, a compensating winding distributed on the pole faces, an armature provided with a commutator, armature coils having a fractional pitch equal to the breadth of the pole faces, and means for producing a commutating field at the pole tips.

4. In a dynamo-electric machine, an armature provided with a commutator and a fractional pitch winding, a laminated field structure, a compensating winding distributed over a portion only of the field corresponding to the pitch of the armature coils, magnetizing coils occupying the portion of the field magnet not occupied by the compensating winding, commutator brushes, and means for producing a commutating field at the points occupied by the coils which at any instant are short-circuited by the brushes.

5. In an alternating-current motor, a laminated stator having polar projections, magnetizing coils carried in the interpolar spaces, a winding distributed on the pole faces, a rotor provided with a commutator and brushes, rotor coils having a fractional pitch equal to the breadth of the pole faces, and means for shifting the phase of the flux at the tips of the poles with respect to the flux over the rest of the pole face.

6. In an alternating-current motor, a laminated stator having polar projections, magnetizing coils carried in the interpolar spaces, a winding distributed on the pole faces, a rotor provided with commutator and brushes, rotor coils having a fractional pitch equal to the breadth of the pole faces, and an impedance connected in shunt to the conductors of the winding distributed on the pole faces which lie at the tips of the poles.

In witness whereof, I have hereunto set my hand this 26th day of February, 1907.

ERNST F. W. ALEXANDERSON.

Witnesses:
  BENJAMIN B. HULL,
  HELEN ORFORD.